United States Patent
Baldemair et al.

(10) Patent No.: US 10,498,576 B2
(45) Date of Patent: Dec. 3, 2019

(54) GUARD INTERVAL ADAPTATION FOR WIRELESS COMMUNICATION

(71) Applicant: Telefonaktiebolaget LM Ericsson (publ), Stockholm (SE)

(72) Inventors: Robert Baldemair, Solna (SE); Erik Dahlman, Stockholm (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/761,853

(22) PCT Filed: Sep. 21, 2015

(86) PCT No.: PCT/SE2015/050980
§ 371 (c)(1),
(2) Date: Mar. 21, 2018

(87) PCT Pub. No.: WO2017/052424
PCT Pub. Date: Mar. 30, 2017

(65) Prior Publication Data
US 2018/0295005 A1 Oct. 11, 2018

(51) Int. Cl.
*H04L 27/26* (2006.01)
(52) U.S. Cl.
CPC .............................. *H04L 27/2607* (2013.01)
(58) Field of Classification Search
CPC ... H04L 27/2607; H04L 69/22; H04L 27/264; H04L 27/2636
See application file for complete search history.

(56) References Cited

U.S. PATENT DOCUMENTS

| 2004/0264431 | A1  | 12/2004 | Rhodes |
| 2005/0099936 | A1* | 5/2005  | Fujii ................... H04L 1/0007 370/203 |
| 2005/0164666 | A1* | 7/2005  | Lang .................. H04B 1/7163 455/282 |
| 2006/0050626 | A1  | 3/2006  | Yucek et al. |
| 2006/0062317 | A1* | 3/2006  | Chang ................ H04L 27/2607 375/260 |
| 2014/0355626 | A1* | 12/2014 | Fechtel .............. H04L 27/2605 370/474 |
| 2015/0117428 | A1  | 4/2015  | Lee et al. |

FOREIGN PATENT DOCUMENTS

WO 2006109134 A1 10/2006

OTHER PUBLICATIONS

PCT International Search Report for International application No. PCT/SE2015/050980—dated May 23, 2016.
PCT Written Opinion of the International Searching Authority for International application No. PCT/SE2015/050980—dated May 23, 2016.

* cited by examiner

*Primary Examiner* — Janice N Tieu
(74) *Attorney, Agent, or Firm* — Patent Portfolio Builders, PLLC

(57) ABSTRACT

There is disclose a method for operating a wireless device in a wireless communication network, wherein the wireless device is configured to communicate utilizing signals in the form of symbols having a pre-determined symbol time length, the method comprising adapting a guarding time length of a guard interval in a symbol. In addition, related methods and devices are discussed.

10 Claims, 10 Drawing Sheets

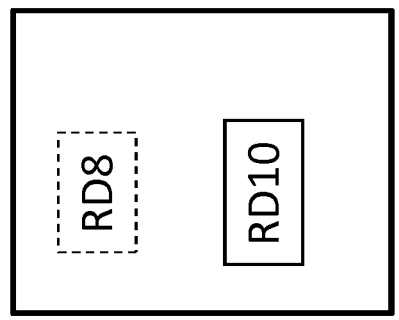
Fig. 9

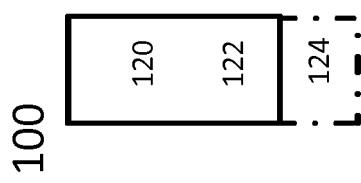

GUARD INTERVAL ADAPTATION FOR WIRELESS COMMUNICATION

PRIORITY

This nonprovisional application is a U.S. National Stage Filing under 35 U.S.C. § 371 of International Patent Application Serial No, PCT/SE2015/050980 filed. Sep. 21, 2015 and entitled "GUARD INTERVAL ADAPTATION FOR WIRELESS COMMUNICATION."

TECHNICAL FIELD

The present disclosure pertains to wireless communication, in particular to signals transmitted as symbols and the structure of symbols.

BACKGROUND

Wireless communication systems are under constant development to cover an increasing width of use cases and improved services, in particular in terms of latency, data rate, reliability, etc. To accommodate future uses, an increased level of flexibility and adaptability, while still providing predictable and reliable communication behavior, will be advantageous. In particular, wireless communication systems going beyond the current LTE standard are being developed to provide such improved services requiring new approaches.

SUMMARY

It is an object of the present disclosure to disclose approach improving the flexibility and adaptability of a wireless communication system, and related individual devices and methods.

There is described a method for operating a wireless device in a wireless communication network, wherein the wireless device is configured to communicate utilizing signals in the form of symbols having a pre-determined symbol time length, the method comprising adapting a guarding time length of a guard interval in a symbol.

Moreover, there is disclosed a wireless device for a wireless communication network, the wireless device being configured to communicate utilizing signals in the form of symbols having a pre-determined symbol length time, the wireless device further being configured for adapting a guarding time length of a guard interval in a symbol.

In addition, there is disclosed a method for operating a wireless device in a wireless communication network, wherein the wireless device is configured to communicate utilizing signals in the form of symbols having a pre-determined symbol time length. The method comprises configuring the wireless device according to an adapted guarding time length of a guard interval in a symbol.

A wireless device for a wireless communication network is also described, wherein the wireless device is configured to communicate utilizing signals in the form of symbols having a pre-determined symbol time length. The wireless device is configured for configuring according to an adapted guarding time length of a guard interval in a symbol.

A program product comprising code executable by control circuitry is furthermore considered, the code causing the control circuitry to carry out and/or control any of the methods described herein.

In addition, a carrier medium carrying and/or storing a program product as described herein and/or code executable by control circuitry is disclosed, the code causing the control circuitry to carry out and/or control any of the methods described herein.

The approaches described herein allow a great flexibility for defining and/or providing one or more guard intervals in a symbol, which in particular allows defining a suitable guard interval allowing switching radio circuitry between reception and transmission or vice versa. In addition, improved granularity for guard intervals, in particular for cyclic prefixes, is provided.

BRIEF DESCRIPTION OF THE DRAWINGS

The drawings are provided for illustrative purposes, and are not intended to limit the approaches to the embodiments shown.

FIGS. 9a) and 9b) show a flowchart of another method for operating a wireless device and a wireless device, respectively;

FIG. 10 shows an example of a wireless device.

DETAILED DESCRIPTION

Figure 1:
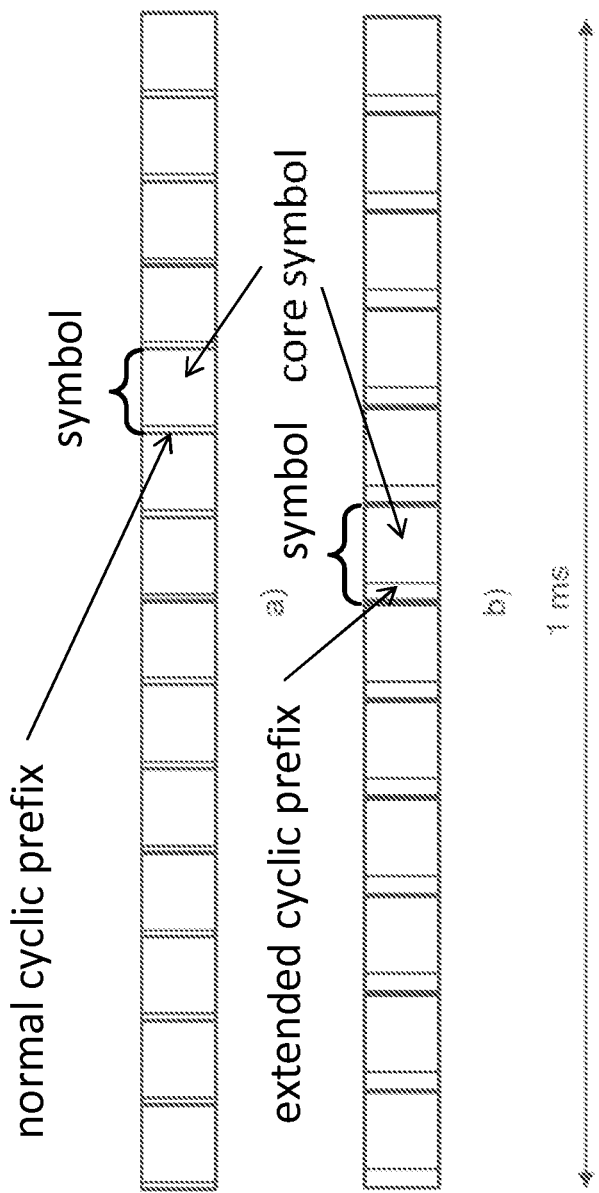
FIGS. 1a) and 1b) schematically show symbols with normal and extended cyclic prefix, respectively.

In the context of this description, wireless communication may refer to communication utilizing electromagnetic fields and/or radiation, in particular in radio frequencies, which may propagate through and/or via the atmosphere. A wireless communication system and/or a wireless device may be configured for such communication, e.g. comprising suitable radio circuitry and/or antenna circuitry and/or control circuitry. Wireless communication may conform to one or more standards, in particular telecommunication standards, more particularly a standard based on LTE (Long-Term Evolution) or related to it. Wireless communication may be cellular and/or mobile communication. A wireless device may generally be a network node and/or radio node of or for a wireless communication system or network, or may be a user equipment or any kind of device adapted or configured for the functionality described herein, e.g. a device for Machine-type communication. A wireless communication network may be considered a wireless communication system, which in particular may comprise one or more wireless device as disclosed herein, in particular at least one network node, which may be a radio node. A radio node may be a network node adapted for wireless communication. A network node generally may be any node of a network, e.g. a higher level node like a management node or Evolved Packet Core or any other node adapted for managing and/or relaying communication or data in the network or related functionality. A radio node may generally be a base station or eNodeB or similar.

Communication or communicating may generally comprise transmitting and/or receiving signals. Signals may generally comprise data, which may include control data and/or user data. A signal may have a power level (e.g., measured at transmission, a transmission power level, or at reception, a reception power level).

A guard interval may be an interval (e.g., in time), which may comprise a prefix, in particular a cyclic prefix, and/or a muted interval—A muted interval generally may be an interval, in particular an interval in time, which may have a muted signal, for example an interval in which no signal transmission is scheduled and/or intended. Some signal hysteresis, e.g. an ramping up or down of a signal or signal strength may be considered part of a muted signal and/or be comprised in a muted interval. A signal may be considered muted if it is below a muting power level (in particular, at transmission); it does not necessarily have to be zero to be considered muted, e.g. because of ramping effects as discussed above.

A symbol may generally comprise a pre-determined symbol time length or symbol time interval. The symbol may comprise a core symbol and optionally one or more guard time intervals, in particular a cyclic prefix.

There is described a method for operating a wireless device in a wireless communication network, wherein the wireless device is configured to communicate utilizing signals in the form of symbols having a pre-determined symbol time length, the method comprising adapting a guarding time length of a guard interval in a symbol.

Moreover, there is disclosed a wireless device for a wireless communication network, the wireless device being configured to, and/or comprising a communication module configured to, communicate utilizing signals in the form of symbols having a pre-determined symbol length time, the wireless device further being configured for, and/or comprising an adapting module for, adapting a guarding time length of a guard interval in a symbol.

In addition, there is disclosed a method for operating a wireless device in a wireless communication network, wherein the wireless device is configured to communicate utilizing signals in the form of symbols having a pre-determined symbol time length. The method comprises configuring the wireless device according to an adapted guarding time length of a guard interval in a symbol.

A wireless device for a wireless communication network is also described, wherein the wireless device is configured to, and/or comprises a communication module adapted to, communicate utilizing signals in the form of symbols having a pre-determined symbol time length. The wireless device is configured for, and/or may comprise a configuring module for, configuring according to an adapted guarding time length of a guard interval in a symbol.

Configuring may be performed based on configuration data, which may be received from a network or another network node, e.g. a wireless device. Configuring may be performed by the wireless device itself, e.g. based on received configuration data.

Configuring the wireless device may comprise receiving, by the wireless device and/or a receiving module of the wireless device, configuration data indicating the adapted guarding time length. Configuring may comprise configuring the wireless device for receiving and/or transmitting symbols having the adapted guarding time length, e.g. by setting circuitry, e.g. control circuitry and/or radio circuitry, to facilitate such receiving and/or transmitting. Receiving may comprise demodulating and/or decoding a received signal or symbol. Transmitting may comprise modulating and/or encoding a symbol accordingly.

There may generally be considered a method for operating a configuring wireless device, the method comprising transmitting configuration data indicating an adapted guarding time length of a guard interval, e.g. to another wireless device. Transmitting may be based on information indicating the adapted guarding time interval, which may be determined or obtained by the configuring wireless device and/or received by this device, e.g. in form of configuration data. A configuring wireless device may be considered, the configuring wireless device being adapted to, and/or comprising a transmitting module adapted to, transmit configuration data indicating an adapted guarding time length of a guard interval, e.g. to another wireless device. Transmitting may be based on information indicating the adapted guarding time interval, which may be determined or obtained by the configuring wireless device and/or received by this device, e.g. in form of configuration data. The configuring wireless device may be configured for performing adapting the guarding time length as described herein and/or the method of operating a configuring wireless device may comprise a corresponding action.

A program product comprising code executable by control circuitry is furthermore considered, the code causing the control circuitry to carry out and/or control any of the methods described herein.

In addition, a carrier medium carrying and/or storing a program product as described herein and/or code executable by control circuitry is disclosed, the code causing the control circuitry to carry out and/or control any of the methods described herein.

The guard interval may generally comprise a cyclic prefix and/or a muted guard interval, in particular a suffix.

A guard interval may be adapted and/or provided to limit or ameliorate interference (for example, inter-symbol interference e.g., a cyclic prefix), or to cover a time for switching between operations modes (transmitting/receiving) of radio circuitry, and/or to allow clear channel assessment (CCA), e.g. in the context of a Listen-Before-Talk (LBT) procedure. A clear channel assessment may generally comprise determining the power received in a given time interval (the assessment or listening interval), e.g. for a given, and/or determining if the power received falls below a pre-determined threshold to determine if the channel is clear (may be accessed). Such an assessment may be performed for a given channel or carrier (and/or frequency range).

A cyclic prefix may be considered a specific form of guard interval arranged at the beginning of the symbol time interval, which may comprise redundant information of the symbol (core symbol). In particular, a cyclic prefix may comprise a copy of the end of the signal of the core symbol, which may cover a time interval equal to the length in time. A cyclic prefix may comprise a muted interval, in particular after being extended.

Adapting a guarding time length of a guard interval in a symbol may pertain to a symbol having the predetermined symbol time length. Adapting the guarding time length of a guard interval may comprise changing the time length, e.g. extending (increasing) or shortening (decreasing) it. Extending may comprise extending from zero, e.g. creating a guard interval. Shortening may comprise shortening to zero, e.g. deleting a guard interval. Adapting may comprise keeping the predetermined symbol time length (and/or the sum of the time lengths of a core symbol plus any guard interval(s)/ cyclic prefix in the symbol) constant and/or at the predetermined value. Generally, adapting a guarding time length may comprise adapting the length of another guard interval, and/or the time length or interval of the core symbol, e.g. in a reverse manner. It may be considered that adapting the guarding time length of a guard interval comprises adapting the number of samples (and/or sampling points) provided or used (e.g. by a modulator) for representing and/or modulating the guard interval and/or a core symbol, respectively, e.g. in the context of digitization and/or (Inverse) FFT representation. Additionally or alternatively, adapting the guarding time length may comprise adapting a sampling rate and/or chip rate used for (Inverse) FFT, e.g. performed by a modulator, in particular for treating and/or modulating and/or representing the core symbol of a symbol, and/or adapting the sample number of the guard interval accordingly. Adapting the guarding time length may alternatively or additionally comprise adapting an interpolator ratio, e.g. an interpolator ratio of an interpolator operatively connected between the output of a modulator (which may modulated the signal of a symbol and/or modulated the symbol) and a DAC (Digital-to-Analog Converter). A wireless device may generally comprise a corresponding modulator and/or a DAC operably connected to the modulator, e.g. via an interpolator of the wireless device. It may be considered that adapting a guarding time length and/or a core symbol time length comprises changing the subcarrier bandwidth of the core symbol. Adapting a guarding time length may comprise determining a guarding time length, e.g. calculating the length and/or choosing from a plurality of pre-determined values. Such values or corresponding indicators may be predetermined, e.g. according to a standard, and/or be stored in a memory and/or indicated by configuration data.

It may be considered that adapting a guarding time length is performed based on operating conditions and/or configuration data, the latter of which may be received, e.g. from another network node and/or the network. Adapting may comprise receiving such configuration data and/or obtaining information indicating operation conditions. Configuration data may be generally be (control) data configuring a wireless device, e.g. indicating transmission and/or reception characteristics to be used (e.g., indicating frequency range, and/or carrier and/or subcarrier information, and/or modulation and/or coding and/or transmission power) and/or scheduling data, which may indicate and/or schedule and/or assign time/frequency resources for transmitting and/or receiving to a wireless device. Obtaining information may comprise reading such information from a memory and/or a table and/or measuring one or more parameters indicating operating conditions. Operating conditions and/or information indicative thereof (and/or corresponding parameter/s) may comprise and/or indicate quality of communication and/or channel state information and/or signal-to-noise and/or signal-to-noise and interference and/or signal-to interference and/or transmission power and/or reception power and/or interference level and/or amount or load of traffic and/or resources scheduled for transmission and/or reception, in particular within one or more specific cells and/or a specific geographical area and/or cell size, and/or expected or scheduled or intended switches of radio circuitry (in particular, switches between transmitting and receiving and/or vice versa; such may be dependent on and/or included in configuration data) and/or corresponding delay times, which may be hardware (circuitry) dependent (corresponding information may be stored in a memory of the wireless device and/or accessible to its control circuitry). Adapting a guarding time length may be based on the communication direction, e.g. depending on whether transmission or reception is to be performed and/or whether operating in UL or DL.

The wireless device may generally be adapted or configured for multi-carrier operation, e.g. OFDMA, or single carrier operation, wherein a single carrier may, but does not necessarily have to, comprise a plurality of subcarriers. In this context, a carrier may be considered to refer to a frequency range, and a subcarrier may refer to a subrange of this range. It may be considered that a wireless device implemented as network node or radio node is adapted for multi-carrier operation.

A cyclic prefix in LTE is described in more detail in the following. LTE uses OFDM (or DFTS-OFDM) with cyclic prefix. The subcarrier bandwidth in LTE is 15 kHz. LTE defines two cyclic prefix configurations, the configuration with normal cyclic prefix and the configuration with extended cyclic prefix. The normal cyclic prefix configuration has 14 OFDM symbols per 1 ms (the time length of a subframe), the core OFDM symbol time length (i.e. excl. cyclic prefix) is 66.67 µs, the cyclic prefix time length is approximately 4.76 µs, the cyclic prefix overhead is approximately 7%. The extended cyclic prefix configuration has 12 OFDM symbols per 1 ms, the core OFDM symbol time length is 66.67 µs, the cyclic prefix is approximately 16.67 µs, the cyclic prefix overhead is 25%. Accordingly, the symbols with normal and extended cyclic prefixes have different overall time lengths.

For future developments, according to one suggestion an OFDM subcarrier bandwidth of 16.875 kHz may be used. Four such OFDM symbols (with cyclic prefix) should fit into 250 µs (representing a subframe-like structure on a shorter timescale), the cyclic prefix time length may be approximately 3.24 µs, which suggests the cyclic prefix overhead to be approximately 5.5%. In addition, a configuration with 3 OFDM symbols per 250 µs is considered, the suggested cyclic prefix time length and the related overhead are 24.07 µs and 41%, respectively.

Figure 2:
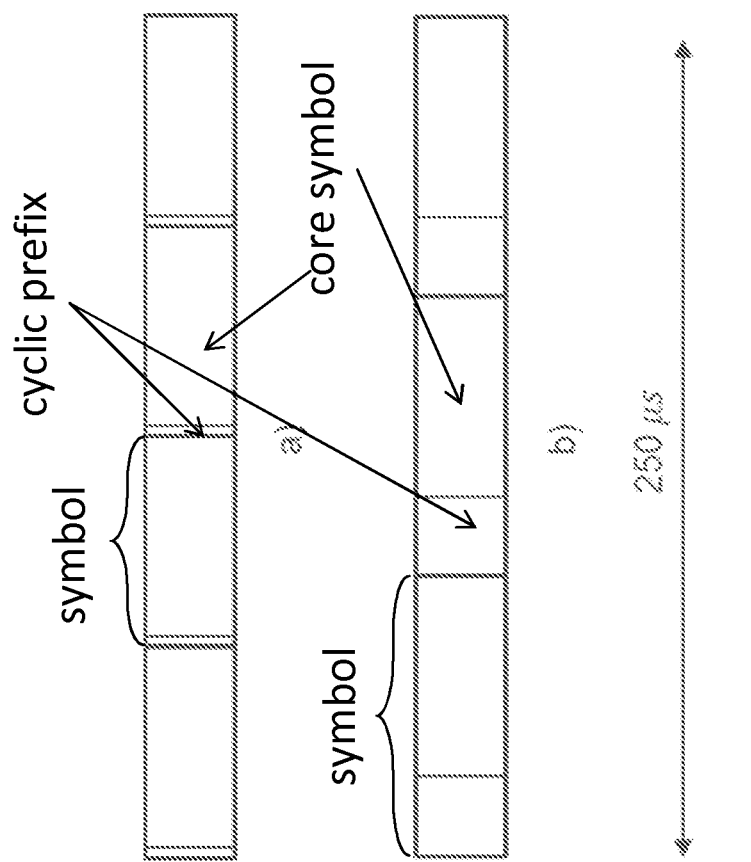
FIGS. 2a) and 2b) schematically show another example of symbols with normal and extended cyclic prefix, respectively.

FIG. 1 and FIG. 2 show normal and extended cyclic prefix for LTE and for the suggested development respectively.

In particular, FIG. 1 shows the normal (a) and extended (b) cyclic prefix configuration for LTE and FIG. 1 shows a normal (a) and extended (b) cyclic prefix configuration for the suggested development.

In particular in a TDD system, guard intervals or periods (the terms period and intervals may be used interchangeably in this disclosure) may be needed between switching of duplex directions and/or between transmitting and receiving. In LTE these guard intervals or periods are created by muting a few OFDM symbols.

The related overhead amounts to a few OFDM symbols per 5 ms or 10 ms, depending on whether one or two switches are configured per 10 ms (the time length of a radio frame comprising 10 LTE subframes).

Creating extended cyclic prefixes leads to reduced number of OFDM symbols per time unit (e.g. 1 ms/a subframe in LTE), and involves distributing the freed time (freed by reducing the number of symbols) over the cyclic prefixes of the remaining OFDM symbols. In LTE, the cyclic prefix overhead increases from 7% to 25% when changing from normal to extended cyclic prefix.

In state of the art TDD OFDM systems guard periods are generated by muting OFDM symbols. If duplex switching happens very often (every few OF DM symbols, as envisioned for some future developments) the switching overhead becomes very large. In addition, guard periods in the order of one OFDM symbol period may be far too long in small cell systems, increasing the overhead unnecessarily.

An adapted, e.g. enlarged or extended (or shortened, in some embodiments) guard interval or cyclic prefix may be generated by shrinking/enlarging the core OFDM symbol (the symbol without cyclic prefix). If the symbol is shortened, the time difference relative to the original core OFDM symbol may be added to the cyclic prefix or guard interval.

In LTE, as an example, in the normal cyclic prefix configuration each OFDM symbol plus cyclic prefix spans 1 ms/14 symbols=71.4 μs (to be more precise, the first symbol of each slot is slightly longer). If an extended cyclic prefix should be created, the duration of one OFDM core symbol plus cyclic prefix remains 71.4, but the core OFDM symbol is shortened from 66.67 μs to (66.67−Δ) μs, the cyclic prefix increases then from 4.76 μs to (4.76+Δ) ρs. The same principle is directly applicable to a guard interval, a unique word, a cyclic suffix, a listening period for Listen Before Talk (LBT) or in particular a clear channel assessment, etc.

The creation of a guard interval or period in TDD follows the same principle: Instead of muting a complete OFDM symbol, a shortened core OFDM symbol may be used, the freed time is then available for the guard period. This approach assumes the symbol time length to be constant.

Accordingly, a fine granular generation of cyclic prefix and guard intervals or periods is provided, allowing tailoring to the needed cyclic prefix/guard period length, e.g. based on operation conditions. Overhead may be reduced and/or inefficiently long muted intervals (e.g. on the level of one or more symbol time lengths) may be avoided.

A variable or adapted cyclic prefix/guard period may be generated by maintaining the time for core OFDM symbol plus cyclic prefix/guard period, or by keeping the symbol time length constant.

Figure 3:
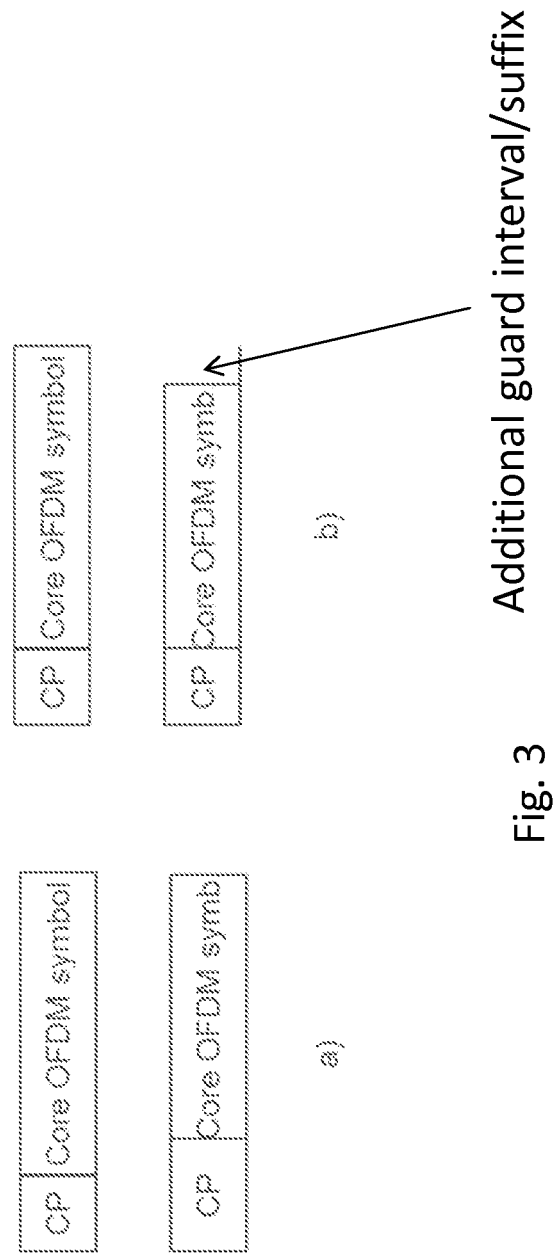
FIGS. 3a) and b) shows examples of adapting a guarding time length of a guard interval in a symbol.

By changing the core OFDM symbol duration or time length by a time difference, the time difference can be added (or subtracted, should the core symbol time length be increased) to the cyclic prefix/guard period, as shown in FIG. 3.

FIG. 3 in particular shows a variable (adaptable) cyclic prefix/guard period that is created by changing the core OFDM symbol time length. a) The freed time is used to extend the cyclic prefix. b) The freed time is used to create a guard period at the end of the symbol. It should be noted that the symbol may be any kind of symbol and is not limited to be an OFDM symbol.

In the following, three different approaches or possibilities how to adapt the guarding time interval and/or to vary the core (OFDM) symbol time length for such adapting are described.

Adapting the guarding time length may comprise any one or any combination of these approaches.

Changing the IFFT size in an OFDM modulator is suggested as approach 1.

Figure 4:
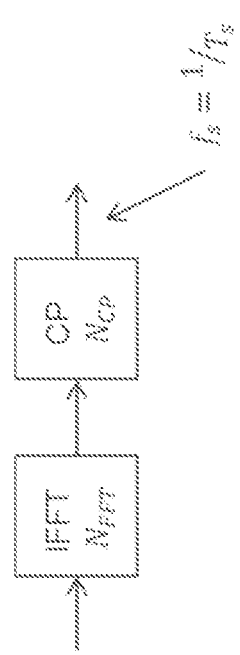
FIG. 4 schematically shows an OFDM modulator.

FIG. 4 shows a simplified picture of an OFDM modulator with cyclic prefix insertion.

The sample rate (also referred to as sampling rate or chip rate) at the output of the modulator is $f_S=1/T_S$, wherein $T_S$ describes the sampling time.

The duration of the core (OFDM) symbol and cyclic prefix are $N_{FFT}T_1$ and $N_{CP}T_S$, respectively, wherein $N_{FFT}$ indicates the number of sampling points for the (Inverse) FFT (Fast Fourier Transform) performed by the modulator on the signal for the core symbol and $N_{CP}$ indicates the number of sampling points for the cyclic prefix. By changing the IFFT size from $N_{FFT}$ to $N_{FFT}-\Delta$ and adding $\Delta$ samples to the cyclic prefix, the cyclic prefix length is adapted (extended) to $T_{CP}'=(N_{CP}+\Delta)T_S=T_{CP}+\Delta T_S$. For ease implementation, the new IFFT size $N_{FFT}'=N_{FFT}-\Delta$ may fulfill certain requirements, e.g. be factorable into 2, 3, and/or 5 or any combination thereof (e.g., the same factors as supported in the spreading DFT in LTE uplink). With a negative 21 value, the cyclic prefix is reduced.

This approach has been described in the context of a cyclic prefix. However, the same approach is directly applicable for a guard interval, guard period, known/unique word, cyclic suffix, etc.

Changing the chip rate (sampling rate) is described as approach 2. In this approach, the IFFT size (number of samples/sampling points) for the core symbol may be maintained as $N_{FFT}$. By changing (e.g. increasing) the chip rate from $f_S$ to $f_S'=N/Mf_S$ (or equivalently changing (e.g. reducing) the sampling time (or chip duration) from $T_S$ to $T_S'=M/NT_S$), the time length duration of the core (OFDM) symbol is changed (e.g., reduced) from $N_{FFT}T_S$ to $N_{FFT}T_S'=N_{FFT}M/NT_S$.

The (freed) time difference $(1=M/N)N_{FFT}T_S$ can be added to the cyclic prefix. Accordingly, the new cyclic prefix has a time length of $$T_{CP}'=[N_{CP}+(1-M/N)N_{FFT}]T_S=T_{CP}+(1-M/N)N_{FFT}T_S.$$

The number of samples in the cyclic prefix $N_{CP}'$ is updated accordingly. If the cyclic prefix should be extended, M<N holds; however, the same principle can be used to create a shorter cyclic prefix by choosing M≥N. The number of samples in the cyclic prefix $N_{CP}'$ is updated accordingly.

The approaches 1 and 2 correspond if in approach 1 $\Delta=(1-M/N)N_{FFT}$ is used. This approach has been described in the context of a cyclic prefix. However, the same approach is directly applicable for a guard interval, guard period, known/unique word, cyclic suffix, etc.

Figure 5:
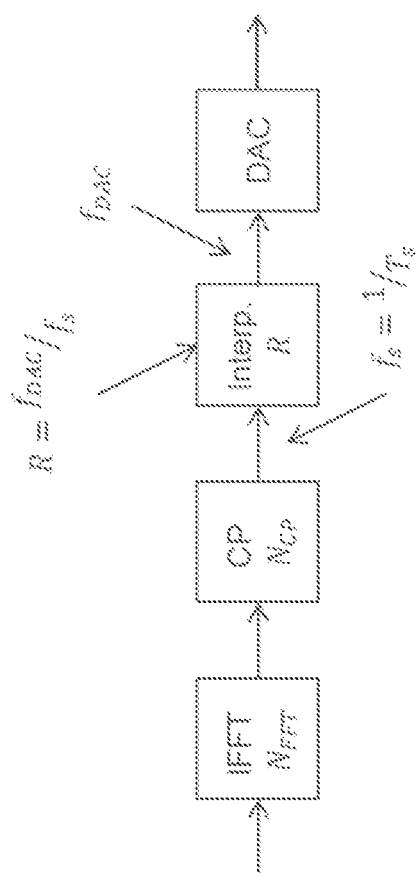
FIG. 5 schematically shows an arrangement with an interpolator.

Changing the interpolation ratio between IFFT and DAC is described as approach 3. The basic principle of this method is similar to the one of approach 2, but this approach utilizes an implementation which keeps a DAC (Digital-Analog-Converter) clock $f_{DAC}$ fixed. Typically, the chip rate $f_S$ observed at the IFFT (or equivalently after cyclic prefix insertion) is different from the DAC clock rate $f_{DAC}$, and an interpolator is needed in-between to convert the sampling rate, see FIG. 5, showing an interpolator converting between a chip rate at IFFT output and a DAC sampling rate.

The IFFT (plus cyclic prefix) insertion block produces every $T_{symb}$ seconds a new data block of length $N_{FFT}+N_{CP}$ samples (representing a symbol). The chip duration at this point is $T_S=1/f_S=T_{symb}/(N_{FFT}+N_{CP})$. The sampling rate of the DAC is $f_{DAC}$. An interpolator may be provided to convert from $f_S$ to $f_{DAC}$.

A corresponding interpolation ratio may be defined as $R=f_{DAC}/f_S=f_{DAC}T_{symb}/(N_{FFT}+N_{CP})$. The cyclic prefix length is $T_{CP}=T_{symb}-N_{FFT}T_S=T_{symb}-N_{FFT}/f_S=T_{symb}-N_{FFT}R/f_{DAC}$.

By changing the interpolation ratio from R to R', the cyclic prefix length changes to $T_{CP}'=T_{symb}-N_{FFT}R'/f_{DAC}$ (with $N_{FFT}$, $f_{DAC}$, and $T_{symb}$ remaining constant). The new cyclic prefix length can also be expressed as $T_{CP}'=T_{CP}+(T_{CP}'-T_{CP})=T_{CP}+(R-R')N_{FFT}/f_{DAC}$. The number of samples in the cyclic prefix $N_{CP}'$ is updated accordingly.

Generally, by changing the interpolation ratio between IFFT output chip rate and DAC sampling rate, the cyclic prefix length is changed. With R>R' the cyclic prefix is increased, R<R' leads to smaller cyclic prefix.

This approach has been described in the context of a cyclic prefix. However, the same approach is directly applicable for a guard interval, guard period, known/unique word, cyclic suffix, etc.

The advantage of changing the interpolation ratio is that the DAC clock remains fixed and only an interpolation filter/ratio needs to be changed. The number of samples in the new cyclic prefix $N_{CP}'$ is adapted or updated to match the required input rate at the interpolator.

Common to the presented approaches 1 to 3 is that they vary the core (OFDM) symbol duration or time length, thus changing the OFDM subcarrier bandwidth. The subcarrier bandwidth $\Delta f$ relates to the chip rate as $\Delta f = f_S/N_{FFT}$. In approach 1, the IFFT size $N_{FFT}$ is changed and by that also the subcarrier bandwidth $\Delta_f$, while in approach 2 the sub-carrier bandwidth $\Delta f$ is varied via a change in the chip rate $f_S$. In approach 3 the chip rate $f_S$ is changed via changing the interpolation ratio R.

Even though outlined above as three independent embodiments the various embodiments can also be combined. For example, approach 1 can be combined with approach 2 and/or 3, e.g., changing the IFFT size while at the same time changing the chip rate $f_S$ (approach 2) and/or changing the interpolation ratio R (approach 3).

Even though outlined in the context of an OFDM system the approaches apply to other systems as well, e.g. a precoded multi-carrier system with cyclic prefix, such as DFTS-OFDM (SC-FDMA) with cyclic prefix.

Some illustrative examples and embodiments are discussed in the following, beginning in the context of adapted or variable cyclic prefix time length.

Some proposals for future developments have a subcarrier bandwidth of $\Delta f = 16.875$ kHz and a cyclic prefix length of $T_{CP} = 3.24$ μs.

In this setup, the IFFT size (sampling point number) would be $N_{FFT} = 2048$ and the chip rate would be $f_S = 34.56$ Hz. Four such OFDM symbols plus cyclic prefix fit into 250 μs. In table 1, different setups for approach 1 (Column $N_{FFT}$) and approach 2 (Column M/N) are listed, along with resulting cyclic prefix ($N_{CP}$ and $TC_P$), overhead OH, and subcarrier bandwidth $\Delta f$.

Figure 6:
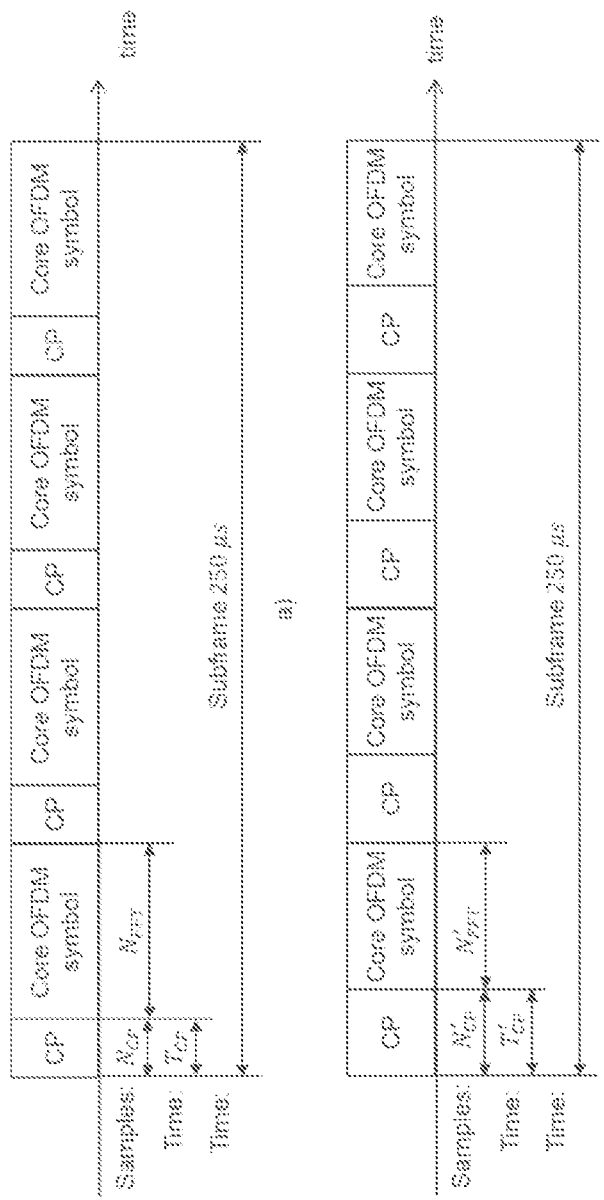
FIGS. 6a) and 6b) show examples of symbols with different guarding time lengths.

FIG. 6a depicts the baseline configuration with $N_{FFT} = 2048$, while FIG. 6b shows a configuration with $N_{FFT}' = N_{FFT} - \Delta$, $\Delta > 0$. Note that the cyclic prefix increases but the number of OFDM symbols does not change.

To maintain orthogonality between users, all users in a cell/beam may use and/or be configured to use the same configuration.

Approaches 2 or 3 could have equally well been used, resulting in the same cyclic prefix duration.

TABLE 1

Different configurations for increased cyclic prefix

| $N_{FFT}$ | $N_{CP}$ | M/N | $T_{CP}$ in μs | OH = $N_{CP}/N_{FFT}$ in % | Subcarrier $\Delta f$ |
|---|---|---|---|---|---|
| 1800 | 360 | 225/256 | 10.42 | 20.00 | 19.20 |
| 1875 | 285 | 1875/2048 | 8.25 | 15.20 | 18.43 |
| 1920 | 240 | 15/16 | 6.94 | 12.50 | 18.00 |
| 1944 | 216 | 243/256 | 6.25 | 11.11 | 17.78 |
| 2000 | 160 | 125/128 | 4.63 | 8.00 | 17.28 |
| 2025 | 135 | 2025/2048 | 3.91 | 6.67 | 17.07 |
| 2048 | 112 | 1/1 | 3.24 | 5.47 | 16.88 |
| 2160 | 0 | 135/128 | 0 | 0 | 16.00 |

Guard periods in TDD are discussed in the following in more detail.

Figure 7:
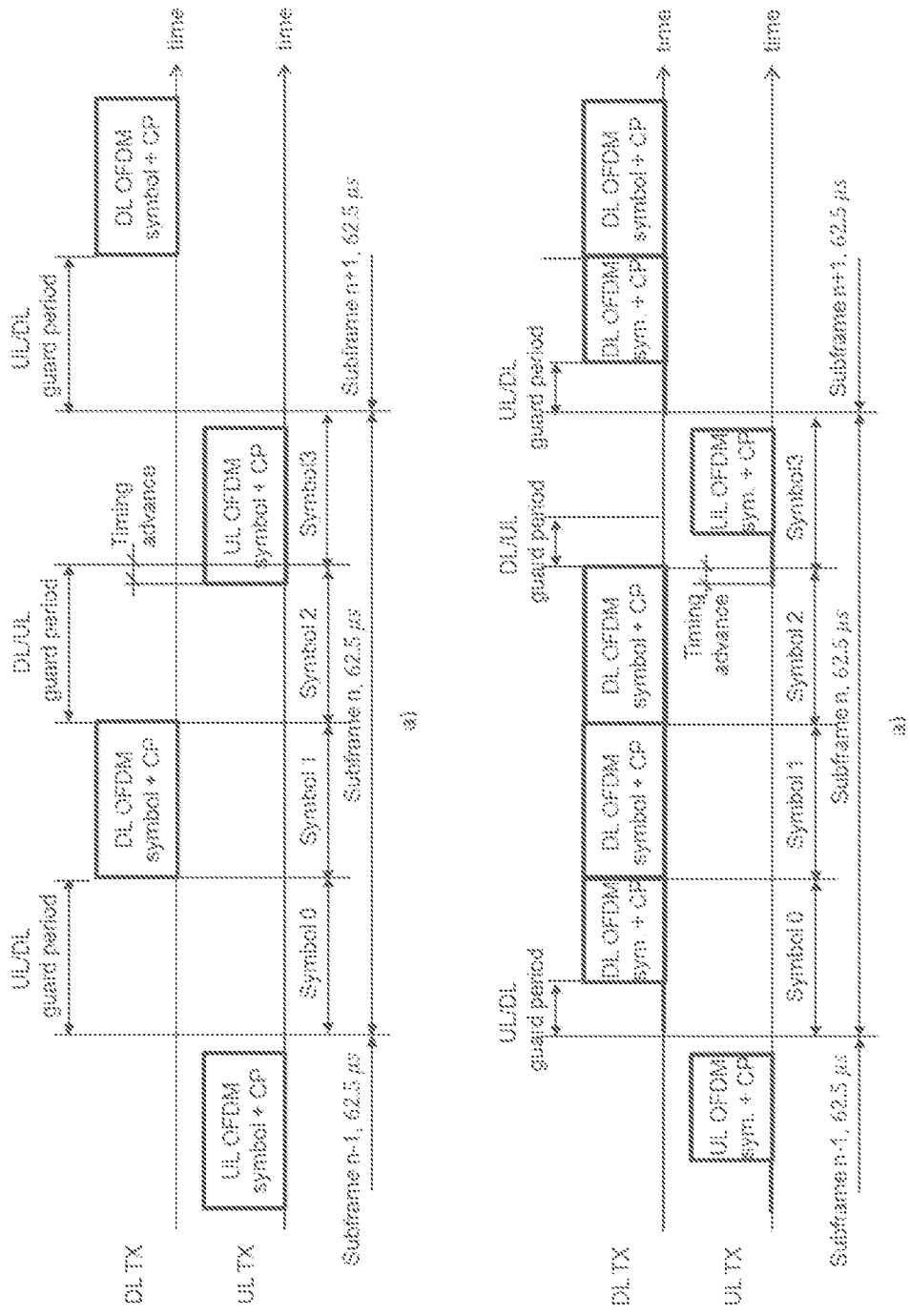
FIGS. 7a) and 7b) show examples of different guarding time lengths in a TDD system.

Another example is depicted in FIG. 7, wherein guard periods at DL/UL and UL/DL borders (the wireless device switching between reception and transmission or vice versa) are generated. The OFDM subcarrier bandwidth is assumed to be 67.5 kHz (the OFDM symbol duration is 59.26 μs) and the cyclic prefix duration is $T_{CP} = 0.81$ μs. A timing advance dependent on the signal traffic time is indicated. Four such OFDM symbols with cyclic prefix fit into a subframe of 62.5 μs.

At the end of a DL subframe an UL slot is created for e.g. fast feedback. Since a subframe comprises only four OFDM symbols, switches happen very frequently. The guard period at DL/UL switch must cover the maximum round trip delay as well as hardware switching time (e.g., of radio and/or control circuitry). The guard period at UL/DL must cover the hardware switching time. As an example, the hardware switching time is assumed to be 3 μS and for the max round trip 1 μs, which corresponds to a maximum cell size of 150 m. Using these numbers, the guard periods at the end of DL and UL become 4 μs and 3 μs, respectively. In FIG. 7a, a solution with guard periods created by muting whole OFDM symbols is shown, muting for 59.25 μs. The created guard periods are much longer than required resulting in a huge resource waste.

In FIG. 7b, an approach as described herein is followed, in which the first DL OFDM symbol in a subframe uses a shorter OFDM symbol. The freed time is placed as guard period at the beginning of the OFDM symbol. Since the generated guard period matches the required one, the OFDM symbol can already be used for DL. Also the UL OFDM symbol is shortened to make time for the DL/UL switch. The created guard period covers for the DL/UL switch, thus the remaining OFDM symbol can be used for UL.

It would have also been possible to shorten the end of the last DL OFDM symbol (Symbol 2) and/or the end of the UL OFDM symbol to create guard periods.

To maintain orthogonality between users, all users in a cell/beam may use and/or be configured to use the same configuration (pertaining to the adapted guard interval).

Listening periods for LBT are discussed in the following in more detail.

If a communication medium (carrier spectrum) is not exclusively assigned to one user/system, some communication protocols demand that the user performs a clear channel assessment before transmitting. One popular form of clear channel assessment is comprised in LBT, where the user has to listen to the medium for a certain time to check if the medium is busy or not. This listening is facilitated by silent periods where the user is not transmitting, but listening to the medium. In state-of-the art OFDM systems, whole OFDM symbols are muted to create these silence period, which can of course result in large overheads if shorter listening periods would be sufficient (LBT usually requires a plurality if CCAs to be performed before a channel is assessed to be free). The methods outlined in this IvD can be used to create LBT listening periods by shortening the core OFDM symbol and using the freed time for CCA/as LBT listening period. The total required number of CCAs for a LBT may be distributed over more than one symbol, wherein only a part of the time length of each symbol may be used for CCA, and the rest to transmit a core symbol.

According to the presented approaches, a variable or adapted cyclic prefix/suffix, guard interval, known/unique word or guard period may be generated, e.g. by adopting or adapting or changing a core OFDM symbol duration. If an extended (reduced) cyclic prefix/suffix, guard interval, known/unique word or guard period should be generated, the core OFDM symbol may be shortened (enlarged) and freed time may be added to the cyclic prefix/suffix, guard interval, known/unique word or guard period or vice versa.

Figure 8:
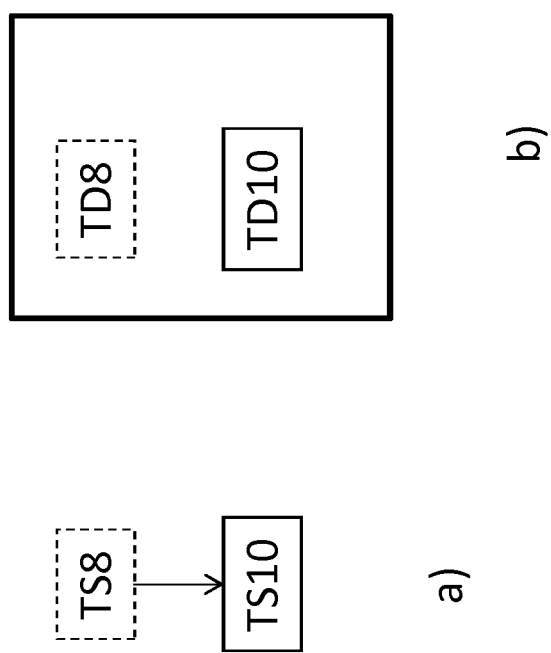
FIGS. 8a) and 8b) show a flowchart of a method for operating a wireless device and a wireless device, respectively.

FIG. 8a) shows an exemplary method for operating for operating a wireless device, e.g. any device as described herein. The method may optionally comprise an action TS8 of obtaining configuration data and/or information indicative of operation conditions. The method further may comprise an action TS10 of adapting a guarding time length of a guard interval in a symbol, which may be performed based on configuration data and/or information obtained in action TS8, if applicable.

FIG. 8b) shows an exemplary corresponding a wireless device for a wireless communication network, e.g. any device as described herein. The wireless device may optionally comprise an obtaining module TD8 for performing action TS8. The wireless device may further comprise an adapting module TD10 for performing action TS10.

FIG. 9a) shows a further example of a method for operating a wireless device in a wireless communication network, which may be a wireless device as described herein. The method comprises an action RS10 of configuring the wireless device according to an adapted guarding time length of a guard interval in a symbol. Action RS10 may comprise receiving corresponding configuration data.

FIG. 9b) shows a further example of a wireless device for a wireless communication network, which may be a wireless device as described herein. The wireless device comprises a configuring module RD10 for performing action RS10 of configuring the wireless device according to an adapted guarding time length of a guard interval in a symbol. The wireless device may comprise a receiving module RD8 for receiving corresponding configuration data.

FIG. 10 schematically show a wireless device 100, which may for example be a network node or base station or eNodeB, or in some examples a user equipment. Wireless device 100 comprises control circuitry 120, which may comprise a controller connected to a memory. Any module of wireless device, e.g. a receiving module and/or transmitting module and/or adapting module and/or configuring module, may be implemented in and/or executable by the wireless device, in particular the control circuitry 120. The control circuitry 120 is connected to control radio circuitry 122 of the wireless device 100, which provides receiver and transmitter and/or transceiver functionality. An antenna circuitry 124 may be connected or connectable to radio circuitry 122 for signal reception or transmittance and/or amplification. The wireless device 100 may be adapted to carry out any of the methods for operating a wireless device disclosed herein; in particular, it may comprise corresponding circuitry, e.g. control circuitry. Any module may be implemented as software, hardware or firmware, or any combination thereof.

There is also disclosed a program product comprising code executable by control circuitry, the code causing the control circuitry to carry out and/or control any one of the method for operating a user equipment or network node as described herein, in particular if executed on control circuitry, which may be control circuitry of a radio node like a user equipment or a network node as described herein.

Moreover, there is disclosed a carrier medium arrangement carrying and/or storing at least any one of the program products described herein and/or code executable by control circuitry, the code causing the control circuitry to perform and/or control at least any one of the methods described herein. A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one memory, in particular at least one of volatile or non-volatile memory, a buffer, a cache, an optical disc, magnetic memory, flash memory, etc. Code may comprise instructions executable by control circuitry and/or parameters, which may be associated to instructions.

Generally, a time length may represent a time interval or period, or shorter an interval. A time length of an interval or symbol may be referred to as duration.

A symbol may generally comprise a core symbol, and optionally one or more guard intervals, in particular a cyclic prefix. A symbol may have a symbol time length, which may be predetermined, e.g. by a standard, and/or be associated to a symbol time interval. There may be pre-defined different symbol time lengths, which may be associated to different symbols or different types of symbols. A symbol and/or core symbol may represent and/or refer to time interval in which a signal comprising a modulated and/or encoded (e.g., for error correction) block of data (e.g., a given number of bits, depending on modulation or encoding) is transmitted (or received), in particular a time interval of signal that carries one spot in a constellation (I/Q constellation) of the modulation used. It is noted that the number of bits transmitted with a core symbol or symbol may depend on the modulation or the constellation provided by such. A guard interval may have a guarding time length representing its time interval. A guard interval may for example be provided as a prefix (before the core symbol in the symbol respectively its associated time interval) or a suffix (after the core symbol). It may be considered that symbol comprises or is adapted to comprise a guard interval as prefix (in particular, a cyclic prefix), as well as a different guard interval as suffix. Different guard intervals in a symbol may have different lengths in time and/or be adapted accordingly.

A wireless device may comprise control circuitry and/or radio circuitry and/or antenna circuitry, and/or be configured or adapted for any functionality described herein. Control circuitry may generally comprise integrated circuitry and/or one or more processing arrangements or processors, which may comprise one or more microprocessors and/or microcontrollers and/or FPGAs (Field-Programmable Gate Array) and/or ASIC (Application Specific Integrated Circuit) and/or processor cores and/or associated memory and/or input/output interfaces and/or devices. Memory may any kind of storage or carrier medium operably connected or connectable to, or included into, control circuitry. Radio circuitry may be adapted or configured to provide receiver and/or transmitter and/or transceiver functionality. It may comprise amplification and/or be tunable, e.g. for specific carrier frequency ranges. Radio circuitry may comprise multiple separate receivers and/or transmitters and/or transceivers. Antenna circuitry may comprise one or more antennas or antenna elements. Antenna circuitry may be operably connected or connectable to radio circuitry and/or control circuitry. It may be considered that control circuitry is adapted or configured and/or connected or connectable to control radio circuitry and/or antenna circuitry, and/or to receive signals or data therefrom and/or to provide signals or data thereto.

In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or future developments wireless communication technologies; however, this does not rule out the use of the present concepts and aspects in connection with additional or alternative mobile communication technologies such as the Global System for Mobile Communications (GSM). While the variants are partially described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

A device that is adapted or configured for specific functionality may comprise the hardware (e.g. circuitry) and/or software and/or firmware allowing it to provide the functionality or perform accordingly. Configuring a device may comprise setting operational parameters of the device; configuring for specific functionality and/or for or with a specific configuration may comprise setting such parameters to enable the device to provide the functionality and/or to operate according to the configuration. Operational parameters may comprise any parameter influencing the operation of the device, in particular pertaining to radio circuitry and/or reception or transmission characteristics. A device may configure itself and/or be configured by another device, e.g. by receiving corresponding configuration data from that device. Configuring may comprise transmitting (by the configuring device) or receiving (by the configured device) configuration data on any or any combination of protocol levels, e.g. on a physical or radio level and/or higher levels, e.g. RRC level (Radio Resource Control).

Configuration data for configuring a device for an adapted guarding time interval may comprise information indicating the type of symbol the adapted guarding time interval pertains to (e.g., UL/DL or transmission/receiving), and/or the (adapted) length of the guard interval and/or the core symbol, and/or the location of the guard interval associated in the symbol, in particular relating to the core symbol (e.g. prefix or suffix), and/or a duration for which the adapted guarding time length is valid (e.g., in terms of frames).

Some useful acronyms comprise
CP Cyclic prefix
DFTS-OFDM Discrete Fourier Transform Spread OFDM
DL Downlink
DAC Digital to Analog Converter
LBT Listen Before Talk
OFDM Orthogonal Frequency Division Multiplex
SC-FDMA Singe Carrier Frequency Division Multiplex
TDD Time Division Duplex
UL Uplink

The invention claimed is:

1. A method for operating a wireless device in a wireless communication network, wherein the wireless device is configured to communicate utilizing signals in the form of symbols having a pre-determined symbol time length, the method comprising:
adapting a guarding time length of a guard interval in a symbol, wherein the adapting the guarding time length is based on a direction of communication of the wireless device, and wherein the adapting the guarding time length comprises:
changing the pre-determined symbol time length by changing:
a number of sampling points of the pre-determined symbol time length and
a sampling time of the pre-determined symbol time length;
calculating a time difference between the changed pre-determined symbol time length and the pre-determined symbol time length; and
adding the calculated time difference to the guarding time length.

2. The method according to claim 1, wherein the guard interval comprises a cyclic prefix and/or a muted guard interval.

3. A non-transitory carrier medium carrying and storing a program product and code executable by control circuitry, the code causing the control circuitry to carry out and control the method according to claim 1.

4. The method according to claim 1, wherein the adapting the guarding time length based on the direction of communication of the wireless device comprises adapting the guarding time length based on whether a transmission or a reception is to be performed.

5. A wireless device for a wireless communication network, wherein the wireless device is configured to communicate utilizing signals in the form of symbols having a pre-determined symbol length time, the wireless device further being configured to:
adapt a guarding time length of a guard interval in a symbol, wherein the guarding time length is adapted based on a direction of communication of the wireless device, and wherein, to adapt the guarding time length, the wireless device is configured to:

change the pre-determined symbol length time, wherein, to change the pre-determined symbol length time, the wireless device is configured to change:
a number of sampling points of the pre-determined symbol length time and
a sampling time of the pre-determined symbol length time;
calculate a time difference between the changed pre-determined symbol length time and the pre-determined symbol length time; and
add the calculated time difference to the guarding time length.

6. The wireless device according to claim 5, wherein the guard interval comprises a cyclic prefix and/or a muted guard interval.

7. A method for operating a wireless device in a wireless communication network, wherein the wireless device is configured to communicate utilizing signals in the form of symbols having a pre-determined symbol time length, the method comprising:
configuring the wireless device according to an adapted guarding time length of a guard interval in a symbol, wherein the adapted guarding time length is based on a direction of communication of the wireless device, and wherein the guarding time length is adapted by:
changing the pre-determined symbol time length by changing:
a number of sampling points of the pre-determined symbol time length and
a sampling time of the pre-determined symbol time length;
calculating a time difference between the changed pre-determined symbol time length and the pre-determined symbol time length; and
adding the calculated time difference to the guarding time length.

8. The method according to claim 7, wherein the guard interval comprises a cyclic prefix and/or a muted guard interval.

9. A wireless device for a wireless communication network, wherein the wireless device is configured to communicate utilizing signals in the form of symbols having a pre-determined symbol time length, the wireless device being configured to:
configure according to an adapted guarding time length of a guard interval in a symbol, wherein the adapted guarding time length is based on a direction of communication of the wireless device, and wherein, to adapt the guarding time length, the wireless device is configured to:
change the pre-determined symbol time length, wherein, to change the pre-determined symbol time length, the wireless device is configured to change:
a number of sampling points of the pre-determined symbol time length and
a sampling time of the pre-determined symbol time length;
calculate a time difference between the changed pre-determined symbol time length and the pre-determined symbol time length; and
add the calculated time difference to the guarding time length.

10. The wireless device according to claim 9, wherein the guard interval comprises a cyclic prefix and/or a muted guard interval.

* * * * *